July 23, 1935.    E. L. MELEY    2,009,117
OIL TANK GAUGING DEVICE
Filed April 7, 1932    5 Sheets-Sheet 1

Inventor
Everett L. Meley

By Fay Oberlin Fay
Attorneys

July 23, 1935.  E. L. MELEY  2,009,117
OIL TANK GAUGING DEVICE
Filed April 7, 1932   5 Sheets-Sheet 3

Inventor
Everett L. Meley

By
Ray Oberlin & Ray
Attorneys

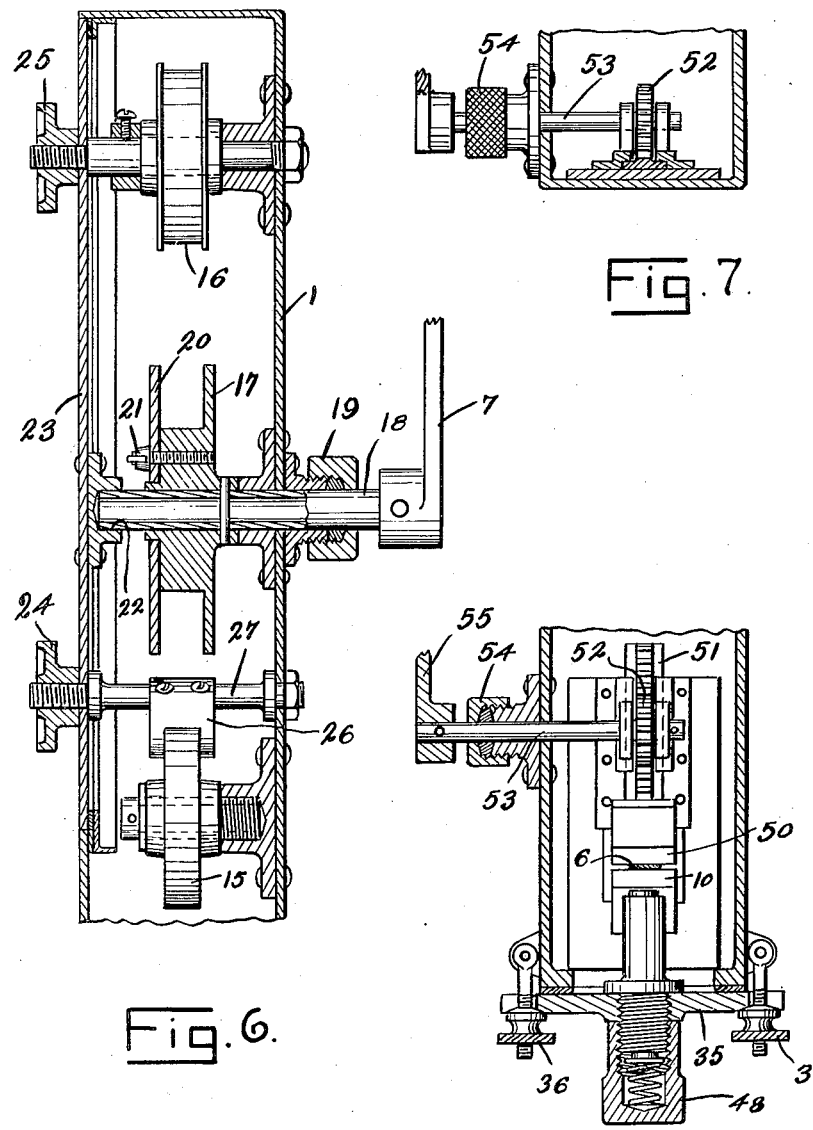

July 23, 1935.　　　　　E. L. MELEY　　　　　2,009,117
OIL TANK GAUGING DEVICE
Filed April 7, 1932　　　　　5 Sheets-Sheet 5

Inventor
Everett L. Meley
By Fay Oberlin & Fay
Attorneys

Patented July 23, 1935

2,009,117

UNITED STATES PATENT OFFICE 2,009,117

OIL TANK GAUGING DEVICE

Everett L. Meley, Beaumont, Tex., assignor to The Oil Conservation Engineering Company, Cleveland, Ohio, a corporation of Ohio Application April 7, 1932, Serial No. 603,824

8 Claims. (Cl. 33—138)

The present invention relating as indicated to an oil tank gauging device, has more particular reference to a means for measuring the quantity or temperature of oil contained in an oil storage tank in which the oil is retained under pressure.

It is the general object and nature of the present invention to provide a device for obtaining access to the interior of a pressure storage tank, for purposes of mensuration without relieving the internal gas pressure of the tank. It is a further object to provide in a compact assembly a gauge line wiping device as well as a gauge line chalking device. Briefly outlined, the embodiment of my invention consists of a flexible steel gauge line wound upon suitably positioned reels within a gas-tight housing, with a transparent panel so placed upon the housing as to permit visible inspection of the gauge line. Objects and advantages additional to those above enumerated shall become apparent as the following description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
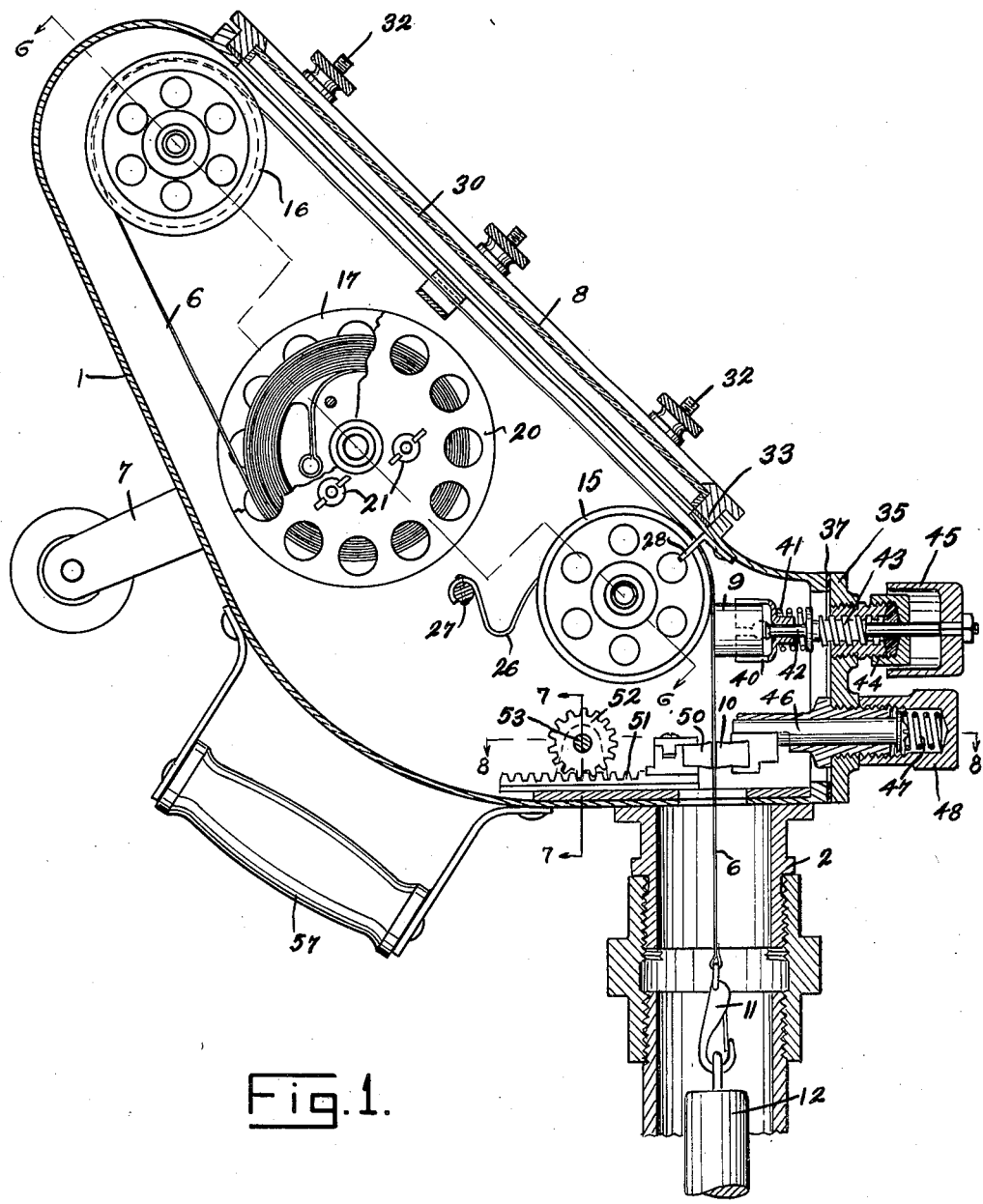
Figure 2:
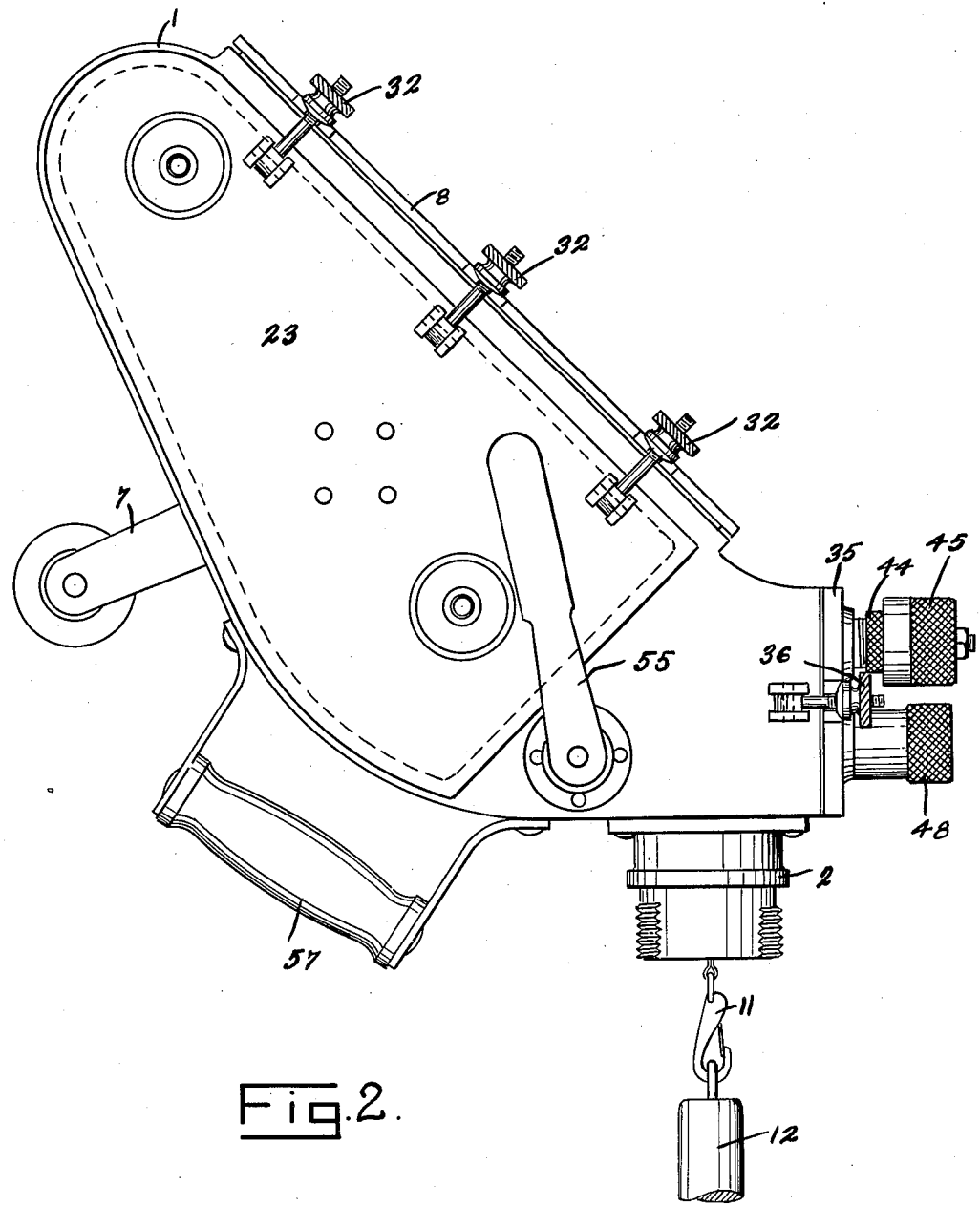
Figures 3, 4, 5:
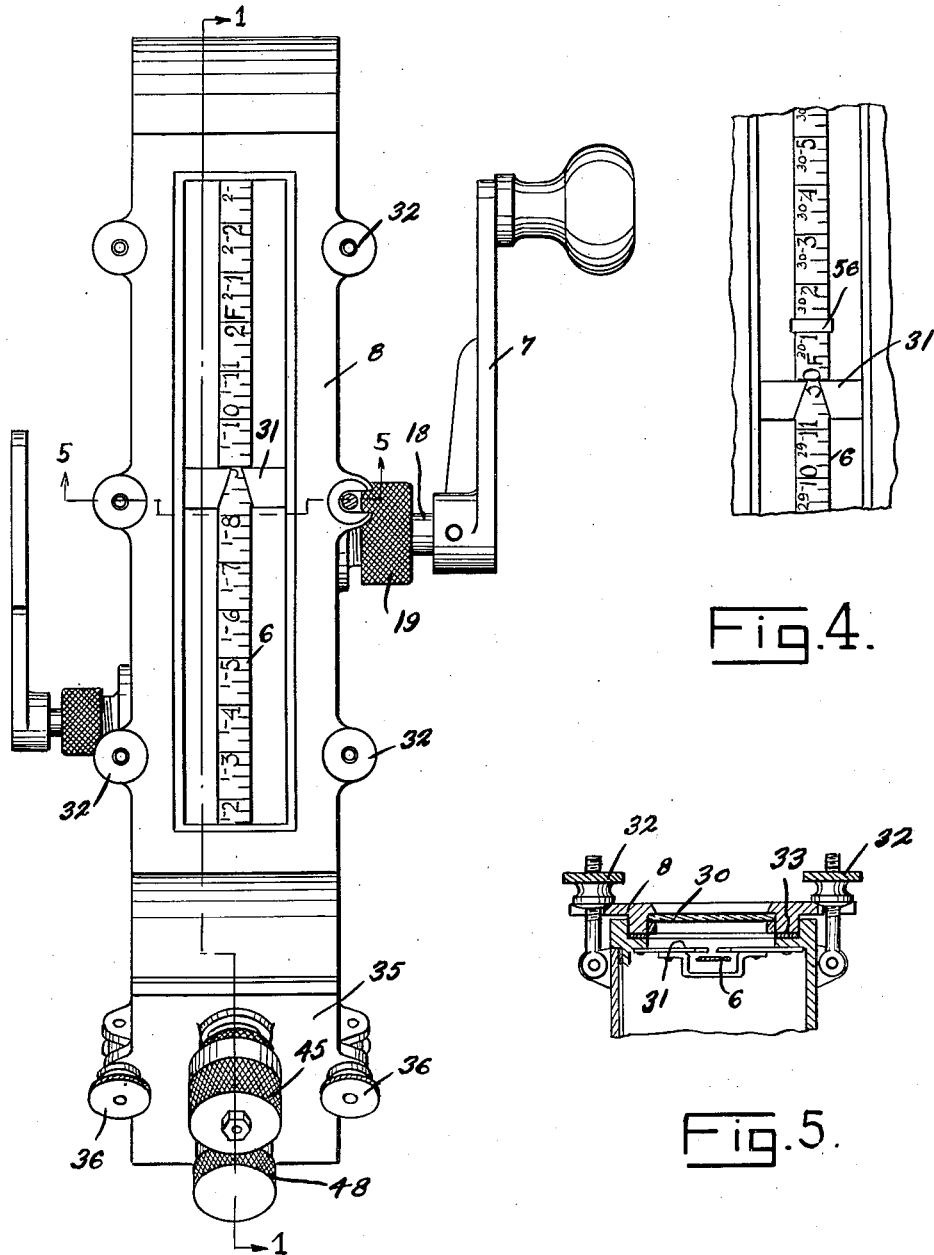
Figure 12:
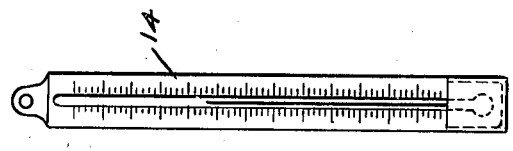
Figure 10:
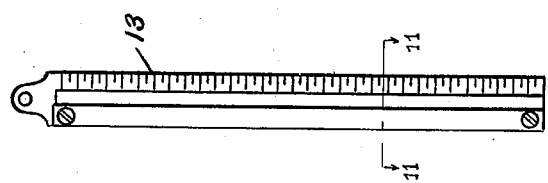
Figure 11:
Figure 9:
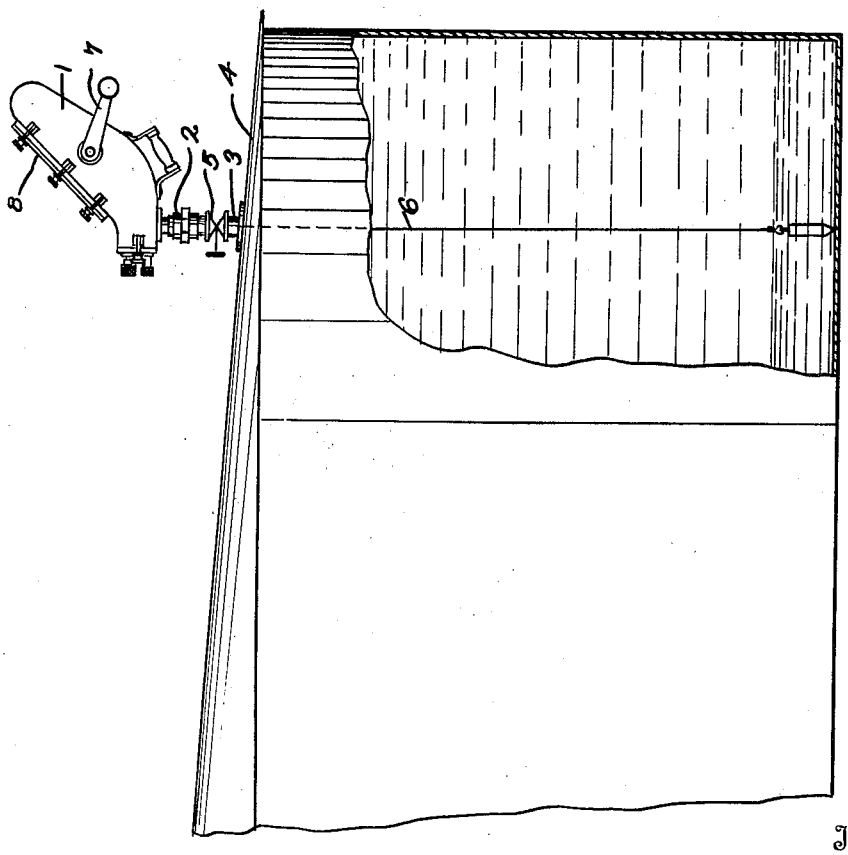

In said annexed drawings:

Fig. 1 is an elevational sectional view taken substantially upon line 1—1 of Fig. 3; Fig. 2 is an elevational exterior view of the device embodying the principle of my invention; Fig. 3 is a plan view of Fig. 2; Fig. 4 is a fragmentary illustration of the transparent sighting panel; Fig. 5 is a fragmentary sectional view taken substantially upon line 5—5 of Fig. 3; Figs. 6, 7 and 8 are fragmentary views taken substantially upon lines 6—6, 7—7 and 8—8 respectively of Fig. 1; Fig. 9 illustrates my gauging device in position upon an oil storage tank; and Figs. 10, 11 and 12 are illustrative of alternative measuring devices which may be used in conjunction with my device.

Referring to Fig. 9, my gauge box consists essentially of the housing 1 having projecting therefrom the threaded fitting tube 2 which is adapted to engage with a suitable inlet pipe or riser 3 on the top of a storage tank 4. An appropriate form of valve 5 is used between the fittings 2 and 3 in order to prevent escape of the gas pressure from the interior of the tank. A gauge line 6 is adapted to be lowered into the interior of the tank by means of rotation of the crank arm 7. After the gauge line 6 has once been lowered to the bottom of the tank, it is then rewound back into the gas-tight housing 1, whereupon the oil depth markings may be read through the sight glass panel 8. The valve 5 of course cannot be closed until the gauge line 6 is completely rewound back into the housing. In order to produce a more definite line of demarcation upon the gauge line 6, a suitably positioned piece of chalk 9 is adapted to bear against the face of the gauge line when lowered into the tank. A felt wiping device 10 is also provided upon the interior of the gas-tight housing 1 in order to clean the surface of the gauge-line upon successive readings.

A snap hook 11 secured to the end of the gauge line 6 may carry the plumb bob 12 for ordinary depth readings or the tank thieving graduate 13 (Figs. 10 and 11), or the thermometer 14 may be attached to the snap hook 11 for the obvious purposes of taking samples or measuring the oil temperatures respectively.

The manner in which the gauge line 6 is carried within the interior of the gas-tight housing is best illustrated by the mechanism shown in Fig. 1, wherein the idler reels 15 and 16 are adapted to guide the gauge line 6 across the face of the sight panel 8. The centrally disposed reel 17 is mounted upon the shaft 18 which extends to the exterior of the gas-tight housing 1 and is atmospherically sealed by means of the packing gland 19. The hand crank 7 is secured to the exterior end of the shaft 18 in order to produce rotation of the reel 17 and thereby wind or unwind the gauge line 6. A flange 20 is removably secured to one side of the reel 17 by means of suitable fastening nuts 21, in order to facilitate the installation and removal of the gauge line 6. The interior end of the shaft 18 is journaled in the bearing 22 which is, in turn, positioned upon the removable inspection panel 23. Knurled thumb screws 24 and 25 serve to removably secure the inspection panel 23 in place upon the housing 1.

A resilient spring 26 mounted upon the transverse shaft 27 is adapted to bear against the face of the idler reel 15 and to serve as a braking means for the reeling action. A suitable guide bracket 28 operates to maintain the gauge line 6 in position upon the idler reel 15.

As above stated, and best illustrated in Figs. 3, 4 and 5, the gauge line 6 is carried past the sight panel 8 in order to provide means for exterior inspection and reading of the line. The sight panel 8 carries the transparent panel 30 and the reading marker 31. The sight panel 8 is also removably secured to the housing 1 by means of the pivoted thumb screws 32 and is atmospherically sealed by means of a suitable air-tight packing 33.

Another removable panel 35, as best illustrated in Figs. 1, 2 and 8 carries the gauge line chalking device 9 and wiper 10. A pair of pivoted thumb screws 36 likewise serve to removably secure the panel 35 to the housing 1. The chalk 9 is carried in the cup-like receptacle 40 which is spring mounted by means of the coil spring 41 upon the shaft 42. The shaft 42 threadably engages with the bushing 43 and is sealed from the exterior atmosphere by means of the packing gland 44. A knurled thumb wheel 45 serves to rotate the shaft 42 and to correspondingly move the chalk 9 in and out of engagement with the face of the gauge line 6, at the will of the operator.

The wiping felt 10 is carried upon the shaft 46 which is spring mounted by means of the coil spring 47, the tension of which is adjustably variable by means of the threaded cap 48. Another wiping felt 50 is disposed upon the opposite side of the gauge line to that of the wiping felt 10. The pressure with which the wiping felt 10 is made to bear against the gauge line 6 is controlled by means of the rack 51 engaging with the gear 52 mounted upon the shaft 53. The shaft 53 extends to the exterior of the housing 1 through the packing gland 54, and is operably rotated by means of the hand lever 55.

An automatic stop 56 may be immovably secured upon the gauge line 6 and is adapted to bear against the reading marker 31 in order to automatically limit the extent of travel of the gauge line.

My above described gauging device may be utilized either as a permanent or portable installation. When it is intended for portable use a suitable handle 57 may be fastened to the exterior of the housing 1.

It will thus be seen that I have provided a unique and novel device for obtaining access to the interior of storage tanks without necessitating the relief of internal gas pressure in the tank, nor subjecting the operator to the hazards of escaping toxic gases.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a gauging device, the combination of an atmospherically sealed housing member, a gauge line normally contained in said member and means operably positioned within said housing member for reciprocal movement of said gauge line, said housing member including a means for automatically chalking said line, and transparent means for visible exterior inspection of said line.

2. In a gauging device, the combination of an atmospherically sealed housing member, a gauge line normally contained in said member and means operably positioned within said housing member for reciprocal movement of said gauge line, said housing member including a means for automatically chalking said line, transparent means for visible exterior inspection of said line, and adjustably operable means for wiping said line.

3. In combination with a liquid storage tank, means for gauging the interior of said tank comprising the combination of a riser on the top of said tank, a valve in said riser, an atmospherically sealed box, a gauge line normally contained in said box, said box having an opening for the passage of the gauge line, and means for removably attaching said box at said opening in sealed relationship to said riser.

4. A gauging device for a liquid storage tank comprising the combination of an atmospherically sealed housing member, a gauge line normally contained in said housing member means contained within said housing member for raising and lowering said gauge line in the interior of said tank, means also contained in said housing for chalking said gauge line, and means for removably attaching said housing member in sealed connection to said tank.

5. A gauging device for a liquid storage tank comprising the combination of an atmospherically sealed housing member, a gauge line normally contained in said housing member means contained within said housing member for raising and lowering said gauge line in the interior of said tank, means also contained in said housing for chalking said gauge line, a transparent panel in said housing for visible exterior inspection and reading of said line, and means for removably attaching said housing member in sealed connection to said tank.

6. A gauging device for a liquid storage tank comprising the combination of an atmospherically sealed housing member, a gauge line normally contained in said housing member means contained within said housing member for raising and lowering said gauge line in the interior of said tank, adjustable pressure wiping means in said housing for said gauge line, and means for removably attaching said housing member in sealed connection to said tank.

7. A gauging device for a liquid storage tank comprising the combination of an atmospherically sealed housing member, a gauge line normally contained in said housing member means contained within said housing member for raising and lowering said gauge line in the interior of said tank, means also contained in said housing for chalking said gauge line, adjustable pressure wiping means in said housing for said gauge line, and means for removably attaching said housing member in sealed connection to said tank.

8. A gauging device for a liquid storage tank comprising the combination of an atmospherically sealed housing member, a gauge line normally contained in said housing member means contained within said housing member for raising and lowering said gauge line in the interior of said tank, means also contained in said housing for chalking said gauge line, a transparent panel in said housing for visible exterior inspection and reading of said line, adjustable pressure wiping means in said housing for said gauge line, and means for removably attaching said housing member in sealed connection to said tank.

EVERETT L. MELEY.